US010229360B2

(12) United States Patent
Towailib et al.

(10) Patent No.: US 10,229,360 B2
(45) Date of Patent: Mar. 12, 2019

(54) DIAGNOSING RESERVOIR HEALTH

(71) Applicant: Saudi Arabian Oil Company, Dhahran (SA)

(72) Inventors: Abdulazeem A. Towailib, Qatif (SA); Jerry P. Fontanilla, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 634 days.

(21) Appl. No.: 14/822,090

(22) Filed: Aug. 10, 2015

(65) Prior Publication Data

US 2017/0046619 A1 Feb. 16, 2017

(51) Int. Cl.
| | |
|---|---|
| G06N 5/04 | (2006.01) |
| G06Q 10/00 | (2012.01) |
| G06Q 10/06 | (2012.01) |
| G06Q 50/06 | (2012.01) |
| G06Q 50/28 | (2012.01) |
| H04L 29/06 | (2006.01) |
| G06Q 10/08 | (2012.01) |

(52) U.S. Cl.
CPC .............. *G06N 5/04* (2013.01); *G06Q 10/08* (2013.01); *G06Q 10/20* (2013.01); *G06Q 50/06* (2013.01); *G06Q 50/28* (2013.01); *H04L 67/42* (2013.01)

(58) Field of Classification Search
CPC combination set(s) only.
See application file for complete search history.

(56) References Cited

U.S. PATENT DOCUMENTS

| | | | |
|---|---|---|---|
| 6,836,731 B1 | 12/2004 | Whalley et al. | |
| 6,907,375 B2 | 6/2005 | Guggari et al. | |
| 7,574,325 B2 | 8/2009 | Dykstra | |
| 7,833,947 B1 * | 11/2010 | Kubala | C09K 8/536 166/305.1 |

(Continued)

OTHER PUBLICATIONS

Bulletin of Environmental Contamination and Toxicology (2018) 101:pp. 262-271 Suitability Assessment of Surface Water Quality with Reference to Drinking, Irrigation and Fish Culture: A Human Health Risk Perspective Priti Saha, Biswajit Paul SpringerLink.*

(Continued)

*Primary Examiner* — Michael B Holmes
(74) *Attorney, Agent, or Firm* — Fish & Richardson P.C.

(57) ABSTRACT

The present disclosure describes methods and systems, including computer-implemented methods, computer program products, and computer systems, for diagnosing reservoir health. One computer-implemented method includes receiving, from a client, a plurality of reservoir diagnostic data associated with a reservoir; computing, at a server, a plurality of reservoir health sub-indices based on the plurality of the reservoir diagnostic data; computing a reservoir health diagnostic index based on the plurality of reservoir health sub-indices and a predetermined category weighting factor; determining that a reservoir health sub-index is below a predetermined threshold; in response to the determining, generating an alert; and sending, to the client, the alert and a cause, wherein the cause indicates a reason that contributes to the reservoir health sub-index being below the predetermined threshold.

18 Claims, 9 Drawing Sheets
(6 of 9 Drawing Sheet(s) Filed in Color)

(56) References Cited

U.S. PATENT DOCUMENTS

| | | | | |
|---|---|---|---|---|
| 7,963,327 | B1* | 6/2011 | Saleri | E21B 43/00 166/252.1 |
| 8,145,427 | B1* | 3/2012 | Saleri | E21B 43/12 166/252.1 |
| 8,145,428 | B1* | 3/2012 | Saleri | E21B 49/00 702/9 |
| 8,175,751 | B2 | 5/2012 | Thakur et al. | |
| 8,301,425 | B2 | 10/2012 | Dale et al. | |
| 8,761,911 | B1 | 6/2014 | Chapman et al. | |
| 9,041,534 | B2* | 5/2015 | McSheffrey | A62C 13/76 340/539.16 |
| 9,085,412 | B1* | 7/2015 | Sasakura | B65G 5/00 |
| 9,747,569 | B2* | 8/2017 | McSheffrey | A62C 13/76 |
| 9,767,421 | B2* | 9/2017 | Saleri | G06Q 10/06 |
| 10,066,148 | B2* | 9/2018 | Luyster | C09K 8/512 |
| 2008/0262898 | A1 | 10/2008 | Tonchev et al. | |
| 2010/0206559 | A1 | 8/2010 | Sequeira, Jr. et al. | |
| 2011/0168391 | A1* | 7/2011 | Saleri | E21B 43/00 166/250.15 |
| 2013/0110524 | A1* | 5/2013 | Saleri | G06Q 10/06 312 705/1.1 |
| 2013/0110563 | A1* | 5/2013 | Saleri | G06Q 10/06 705/7.11 |
| 2014/0039860 | A1 | 2/2014 | Carvajal et al. | |
| 2014/0121972 | A1 | 5/2014 | Wessling et al. | |
| 2014/0121973 | A1 | 5/2014 | Buchanan et al. | |
| 2017/0046619 | A1* | 2/2017 | Towailib | G06Q 10/08 |
| 2017/0335665 | A1* | 11/2017 | Saleri | E21B 41/0092 |

OTHER PUBLICATIONS

A Generalizedwater Quality Index for Taiwan Shiow-Mey Liou*, Shang-Lien Lo and Shan-Hsien Wang Environmental Monitoring and Assessment 96: pp. 35-52, 2004.*

Earth Science & Climatic Change Karmaoui et al., J Earth Sci Clim Change 2014, S11 Environmental Vulnerability to Climate Change and Anthropogenic Impacts in Dryland, (Pilot Study: Middle Draa Valley, South Morocco) pp. 1-12.*

International Search Report and Written Opinion of the International Searching Authority issued in International Application No. PCT/US2015/058218 dated Mar. 30, 2016; 12 pages.

* cited by examiner

| 2012 SRM PILOT RHDI ALERTS ISSUED | | | |
|---|---|---|---|
| Field/ Reservoir | Alert Issued | Index | Underlying Cause |
| Reservoir 1 | Red | Pressure Mgmt Index | Low IPR Distr. Eff of 40 %, Act. Pressure= 1653 psi vs. Target Pressure= 1800 psi |
| | Amber | Water Mgmt Index | WC increased 2.7 % (1 to 3.7 %) |
| Reservoir 2 | Amber | Experience Transfer Ind | High Wells per Engr (105) & Low PDP per Sr. Engr (1) |
| Reservoir 3 | Amber | Experience Transfer Ind | High Wells per Engr (160) & Low PDP per Sr. Engr (0.4) |
| Reservoir 4 | Amber | Simulation Model Quality | Low Simulation Model Quality (67 %) |
| | Amber | Water Mgmt Index | WC increased 5.3 % (16.5 to 22.8 %) |
| | Amber | Stimulation Tech Index | 0 wells in last 3 years with Stim Tech |
| Reservoir 5 | Red | Displacement Ass Ind | No Field ROS test |
| | Amber | Recovery Eff Index | Low RF of 50 % vs Ideal RF of 78.4 % |
| | Amber | Sim Model Quality | Low Pressure & WC History Match, Low PVT Coverage |
| | Amber | Pressure Mgmt Index | Low % Target IPR Achieved of 25 % |
| Reservoir 6 | Amber | Water Encroachment Ind | Low Areal Eff of 70 %, Low Vertical Eff of 65 % |
| | Red | Displacement Ass Ind | Low Field ROS test |
| | Red | Well Rate Design Ind | No simulation guided well rates |
| | Amber | Geol Model Quality Ind | Low Geol Model Quality Ind of 65.5 % |
| | Amber | Simulation Model Quality | Low Simulation Model Quality (52.9 %) |
| | Red | Sim Model Utilization | 0 % level of sim model use & influence in OP & BP |
| | Red | Pressure Mgmt Index | Low % Target IPR Achieved (77 %), & Low IPR Distribution Eff of 50 % |
| | Amber | Experience Transfer Ind | High Wells per Engr (150) & Low PDP per Sr. Engr (1) |

DIAGNOSING RESERVOIR HEALTH

BACKGROUND

In the petroleum industry, a service company can monitor and manage the health of reservoirs, for example a petroleum reservoir. In some cases, a reservoir manager may use standard performance data reporting tools to obtain performance data associated with a reservoir. This performance data can include, for example, production rate, injection rate, Injection Production Ratio (IPR), facilities data, cost, and other production data for one or more reservoirs. However, standard reporting tools do not provide underlying causes for determined healthy or unhealthy performance of the reservoir. Therefore, it is difficult for reservoir managers to diagnose petroleum reservoir performance and to develop mechanisms to improve reservoir health.

SUMMARY

The present disclosure describes methods and systems, including computer-implemented methods, computer-program products, and computer systems, for diagnosing reservoir health. One computer-implemented method for diagnosing reservoir health receiving, from a client, a plurality of reservoir diagnostic data associated with a reservoir; computing, at a server, a plurality of reservoir health sub-indices based on the plurality of the reservoir diagnostic data; computing a reservoir health diagnostic index based on the plurality of reservoir health sub-indices and a predetermined category weighting factor; determining that a reservoir health sub-index is below a predetermined threshold; in response to the determining, generating an alert; and sending, to the client, the alert and a cause, wherein the cause indicates a reason that contributes to the reservoir health sub-index being below the predetermined threshold.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the alert and the cause are displayed at the client.

A second aspect, combinable with any of the previous aspects, wherein the pluralities of the reservoir diagnostic data are received from the client over a communication network.

A third aspect, combinable with any of the previous aspects, wherein the generating the alert comprises: when the reservoir health sub-index is below a first predetermined threshold and is above a second predetermined threshold, generating a first level of alert; and when the reservoir health sub-index is below the second predetermined threshold, generating a second level of alert.

A fourth aspect, combinable with any of the previous aspects, wherein the plurality of reservoir health sub-indices comprises at least one of a reservoir management design sub-index, a modeling and predictive capability assessment sub-index, a development and operation plan sub-index, a reservoir surveillance sub-index, a technology application sub-index, or a knowledge management sub-index.

A fifth aspect, combinable with any of the previous aspects, wherein computing each of the plurality of reservoir health sub-indices further comprises: computing a plurality of sub-category indices based on the plurality of the reservoir diagnostic data; and computing the reservoir health sub-index based on the plurality of sub-category indices and a predetermined sub-category weighting factor.

A sixth aspect, combinable with any of the previous aspects, further comprising retrieving a previously computed reservoir health sub-index of the reservoir; calculating a difference between a computed reservoir health sub-index and the previously computed reservoir health sub-index; and sending the difference to the client.

The subject matter described in this specification can be implemented in particular implementations so as to realize one or more of the following advantages. The described approach can identify area(s) of improvements and critical issues pertaining to reservoirs. This approach can also provide a robust and practical methodology for reservoir managers to learn the underlying cause(s) of reservoir health issues, to take specific actions to address determined deficiencies, and to improve the health of reservoirs. Furthermore, this approach can automatically track the trend of reservoir health over time by storing reservoir health indices and comparing them with historical indices. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

The patent or application file contains at least one drawing executed in color. Copies of this patent or patent application publication with color drawing(s) will be provided by the Patent and Trademark Office upon request and payment of the necessary fee.

FIG. 5 illustrates an example display of an alert chart according to an implementation.

Like reference numbers and designations in the various drawings indicate like elements.

DETAILED DESCRIPTION

Figure 1:
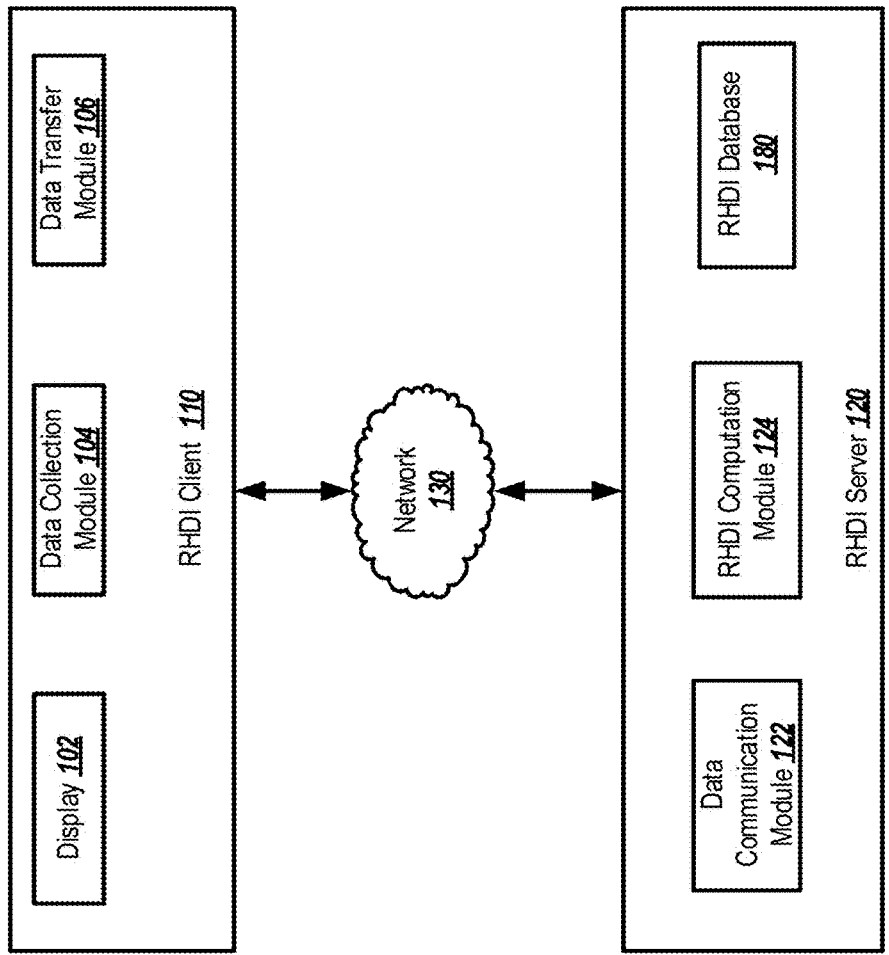
FIG. 1 is a high-level architecture block diagram of a reservoir health diagnosis system (RHDS) according to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes methods and systems, including computer-implemented methods, computer program products, and computer systems, for diagnosing reservoir (e.g., a petroleum reservoir) health. In some cases, performance data of a reservoir can be reported to a reservoir manager by a standard reporting tool. This performance data can include, for example, production rate, injection rate, IPR, facilities data, cost, and other production data for one or more reservoirs. However, standard reporting tools do not provide underlying causes for determined healthy or unhealthy performance of the reservoir. Therefore, it is difficult for reservoir managers to diagnose petroleum reservoir performance and to develop mechanisms to improve reservoir health.

In some cases, a structured technical tool can be developed to assess and diagnose the overall health of reservoirs. The tool can also identify areas of improvement and critical issues associated with the reservoirs. For example, the tool may identify declines in reservoir pressure due to overproduction, deficiency in water injection, lack of reservoir data to enable evaluation, lack of experience staff, or a combination thereof. Accordingly, reservoir managers can take corresponding actions to address reservoir issues and to improve and maintain the health of the reservoirs. Examples of the corresponding actions may include decreasing production, increasing injection, arresting reservoir pressure decrease, improving Injection Production Ratio (IPR), obtaining field, reservoir, conducting laboratory test data to enable evaluation, and increasing number of experience staff.

In some cases, the structured tool can compute a Reservoir Health Diagnostic Index (RHDI) based on a plurality of data points of reservoir diagnostic data. FIGS. 1-4, 5A-5B, 6A-6B, and 7-9 and associated descriptions provide additional details of these implementations. As will be described in more detail, the plurality of reservoir diagnostic data can include reservoir quality data, expert reservoir engineers' input, or a combination thereof. In some cases, the RHDI is calculated based on a plurality of reservoir health sub-indices and predetermined category weighting factors. Following is a list of example sub-indices and their category weighting factors: reservoir management design sub-index (20%), modeling and predictive capability assessment sub-index (15%), development and operation plan sub-index (25%), reservoir surveillance sub-index (20%), technology application sub-index (10%), and knowledge management sub-index (10%). Each sub-index indicates the performance of a category associated with the sub-index. In some cases, the tool can issue alerts if a reservoir health sub-index indicates a sub-optimal performance. For example, a reservoir health sub-index that is below a predetermined threshold indicates a sub-optimal performance in the associated category. Therefore, a reservoir manager can take specific actions to address these areas of deficiencies.

FIG. 1 is a high-level architecture block diagram of a (RHDI) system 100 according to an implementation. At a high level, the illustrated RHDI system 100 includes an RHDI client 110 that is communicably coupled with an RHDI server 120 through a network 130. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

In some implementations, the RHDI client 110 can represent an application, set of applications, software, software modules, hardware, or combination thereof that can be used to receive reservoir health diagnosis data and display RHDI and alerts. As illustrated, the RHDI client 110 can include a communicably coupled display 102, data collection module 104, and data transfer module 106.

In some cases, the RHDI client 110, or any components thereof, can be implemented using a web-based application. For example, the RHDI client 110 can be implemented as a desktop computer. Any of the component modules of the RHDI client 110 can be implemented using WebLogic.

In some implementations, the data collection module 104 can represent an application, set of applications, software, software modules, hardware, or combination thereof that can be used to receive reservoir health diagnosis data. In some cases, the reservoir health diagnosis data can be based on answers from questionnaires or checklists. For example, the reservoir health diagnosis data can include answers to questions related to the existence and effectiveness of a master surveillance plan. In these or other cases, the data can be entered by a coordinator at the RHDI client 110. Alternatively or in combination, the questionnaires or checklists can be accessed and filled using a web-based application. The data collection module 104 can retrieve the filled questionnaires or checklists and translate the subjective answers into numerical values. In some cases, the reservoir health diagnosis data can be based on reservoir quality data stored in a database. For example, the reservoir health diagnosis data can include year-over-year rate of changes of the gas production for a reservoir. In these or other cases, the data can be retrieved by the data collection module 104. FIGS. 2-4, 5A-5B, 6A-6B, and 7-9 and associated descriptions can provide additional details of these implementations.

In some implementations, the data transfer module 106 can represent an application, set of applications, software, software modules, hardware, or combination thereof that can be used to send reservoir health diagnosis data to the RHDI server 120 and receive indices and alerts from the RHDI server 120. FIGS. 2-4, 5A-5B, 6A-6B, and 7-9 and associated descriptions can provide additional details of these implementations.

In some implementations, the display 102 represents an application, set of applications, software, software modules, hardware, or combination thereof that can be used to display reservoir health indices, sub-indices, and alerts received from the RHDI server 120. FIGS. 2-4, 5A-5B, 6A-6B, and 7-9 and associated descriptions provide additional details of these implementations.

In some implementations, the RHDI server 120 can represent an application, set of applications, software, software modules, hardware, or combination thereof that can be used to calculate and store a RHDI and data used to determine reservoir health in its sub-indices. As illustrated, the RHDI server 120 can include a communicably coupled data communication module 122, RHDI computation module, and RHDI database 180.

In some implementations, the data communication module 122 represents an application, set of applications, software, software modules, hardware, or combination thereof that can be used to receive reservoir health diagnosis data from the RHDI client 110 and send indices and alerts to the RHDI client 110. FIGS. 2-4, 5A-5B, 6A-6B, and 7-9 and associated descriptions can provide additional details of these implementations.

In some implementations, the RHDI computation module 124 can represent an application, set of applications, software, software modules, hardware, or combination thereof that can be used to compute RHDI and sub-indices. FIGS. 2-4, 5A-5B, 6A-6B, and 7-9 and associated descriptions can provide additional details of these implementations.

In some implementations, the RHDI database 180 can represent an application, set of applications, software, software modules, hardware, or combination thereof that can be used to store RHDI and sub-indices. In one example, the RHDI database 180 can be an ORACLE database. In some cases, previously computed RHDIs and sub-indices can be retrieved from the RHDI database 180 to analyze the trend of the reservoir health. FIGS. 2-4, 5A-5B, 6A-6B, and 7-9 and associated descriptions can provide additional details of these implementations.

In some cases, as illustrated, the RHDI database 180 can be implemented on the same platform as the RHDI server 120. Alternatively or in combination, the RHDI database 180 can be implemented on a different platform that is communicatively coupled with the RHDI server 120.

The network 130 facilitates communications between the components of the RHDI system 100 (e.g., between the RHDI client 110 and the RHDI server 120). In some implementations, the network 130 can be a wireless or a wireline network. In some implementations, the network 130 can also be a memory pipe, a hardware connection, or any internal or external communication paths between the components.

While portions of the elements illustrated in FIG. 1 are shown as individual modules that implement the various features and functionality through various objects, methods, or other processes, the software can instead include a number of sub-modules, third-party services, components, libraries, and the like, as appropriate. Conversely, the features and functionality of various components can be combined into single components as appropriate.

Figure 2:
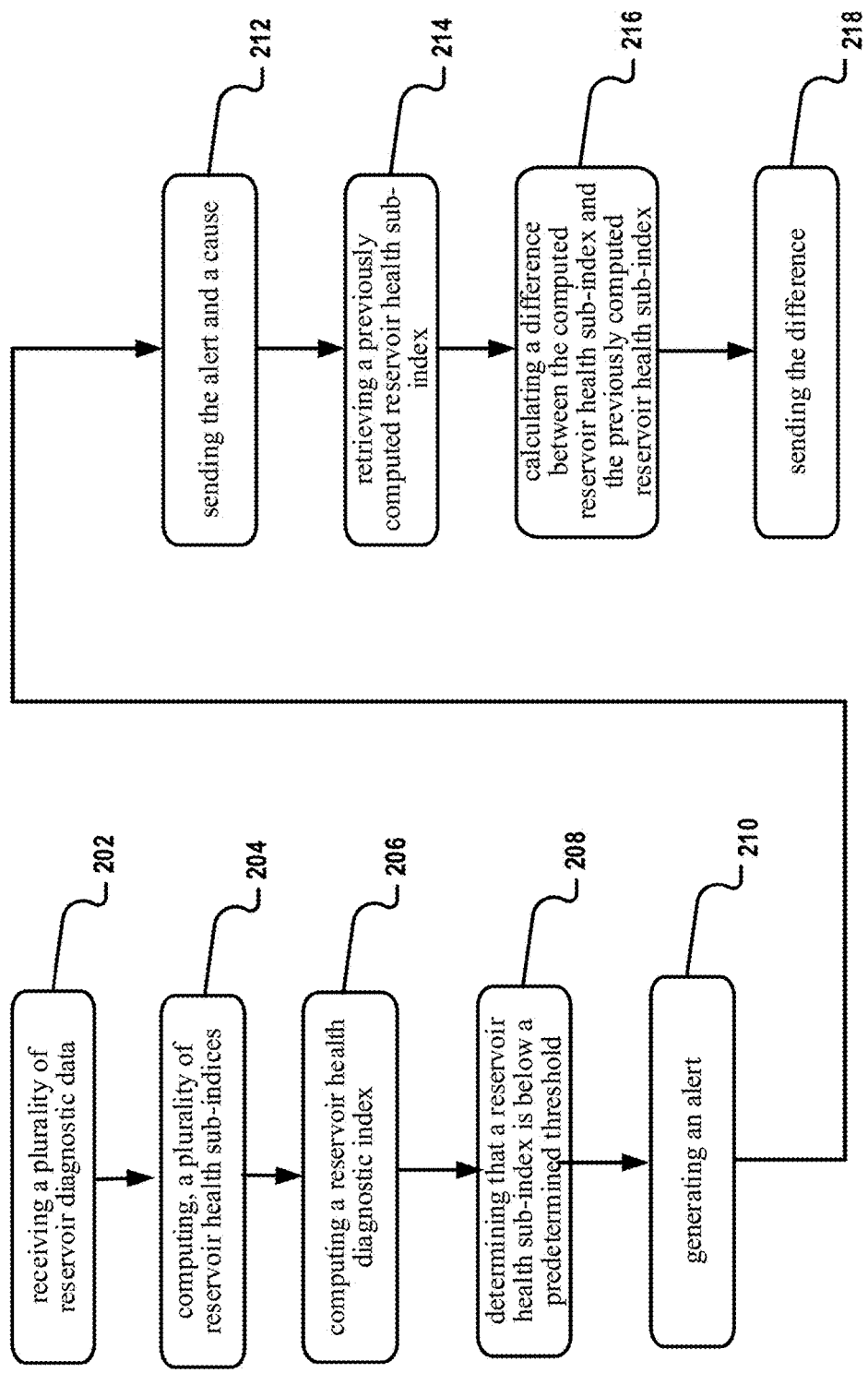
FIG. 2 illustrates an example method for diagnosing reservoir health according to an implementation.

FIG. 2 illustrates an example method 200 for diagnosing reservoir health according to an implementation. For clarity of presentation, the description that follows generally describes method 200 in the context of FIGS. FIGS. 1, 3-4, 5A-5B, 6A-6B, and 7-9. However, it should be understood by those of ordinary skill in the art that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

At 202, a plurality of reservoir diagnostic data associated with a reservoir is received. In some cases, the plurality of reservoir diagnostic data can be received from an RHDI client over a communication network. In some cases, the plurality of reservoir diagnostic data can include objective data, subjective data, or a combination thereof. For example, the objective data can include reservoir quality data, e.g., data related to production, pressure, service log, geological quality, petrophysical quality, and reservoir engineering. In some cases, the RHDI client can retrieve the objective data from one or more sources, e.g., corporate databases of the reservoir management companies or special databases related to each reservoir.

The subjective data can include numerical equivalent ratings based on answers from questionnaires or checklists. In some cases, the questionnaires or checklists can be accessed and filled using a web-based application. The RHDI client can retrieve the filled questionnaires or checklists and translate the subjective answers into numerical values. From 202, method 200 proceeds to 204.

At 204, a plurality of reservoir health sub-indices is computed based on the plurality of the reservoir diagnostic data. In some cases, a plurality of sub-category indices is computed based on the reservoir diagnostic data. The reservoir health sub-index is computed based on the plurality of sub-category indices and a predetermined sub-category weighting factor. FIGS. 4, 5A-5B, 6A-6B, and 7-9 and associated descriptions provide additional details for these implementations. From 204, method 200 proceeds to 206.

At 206, an RHDI for a reservoir is computed based on the plurality of reservoir health sub-indices and a predetermined category weighting factor. In some cases, the weighting factors, e.g., the category weighting factor and the sub-category weighting factor, can be determined by a reservoir manager based on the importance and priority of each category and sub-category. In some cases, the weighting factors can be adjusted based on the sizes and business activities of the petroleum companies that own or manage the reservoir. In some cases, the weighting factors can be stored in a database and retrieved by the RHDI server in computing the RHDIs, the reservoir health sub-indices, or a combination thereof.

Figure 4:
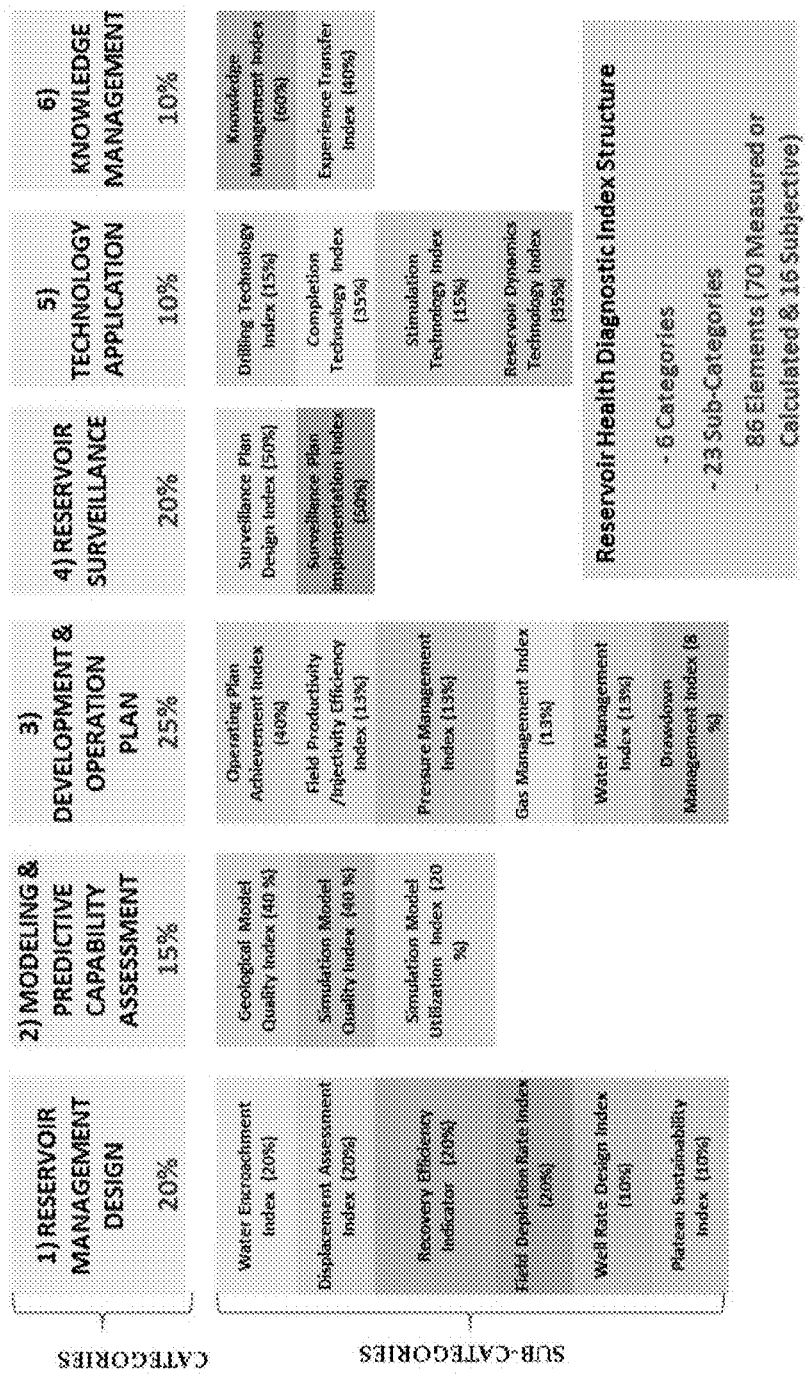
FIG. 4 illustrates an example RHDI structure according to an implementation.

FIG. 4 illustrates an example RHDI structure 400 according to an implementation. In the illustrated example, the example RHDI structure 400 includes six categories, including reservoir management design, modeling and predictive capability assessment, development and operation planning, reservoir surveillance, technology application, and knowledge management. In some cases, the RHDI structure 400 can include any of the above mentioned categories, any additional categories, or a combination thereof. In some implementations, a reservoir health sub-index can be computed for each category. The sub-index can be used to indicate the health of the reservoir with respect to a particular category. An RHDI can be computed based on the reservoir health sub-indices and category weighting factors. In the illustrated example, each reservoir health sub-index is associated with a category weighting factor. For example, the reservoir management design sub-index and the reservoir surveillance sub-index each has a category weighting factor of 20%. The modeling and predictive capability assessment sub-index has a category weighting factor of 15%. The development and operation plan sub-index has a category weighting factor of 25%. The technology application sub-index and the knowledge management sub-index each has a category weighting factor of 10%. Therefore, the product of each sub-index and the corresponding category weighting factor can be summed to produce the RHDI for a reservoir.

As shown in FIG. 4, each category can include sub-categories. Each sub-category can have a corresponding sub-category weighting factor. Therefore, each reservoir health sub-index can be computed by summing the products of each sub-category index and the corresponding sub-category weighting factor.

For example, the reservoir management design category can include the following six sub-categories:
1. Water Encroachment (20%)
2. Displacement Assessment (20%)
3. Recovery Efficiency (20%)
4. Field Depletion Rate (20%)
5. Well Rate Design (10%)
6. Plateau Sustainability (10%)

In this example, the reservoir management design sub-index can be used to indicate how well reservoir management principles are applied to reservoirs. Table 1 shows an example calculation of the reservoir management design sub-index.

TABLE 1 example calculation of the reservoir management design sub-index

| Category | 1) Reservoir Management Design 20% |
|---|---|
| Sub-categories | 1) Water Encroachment Index (20%) |
| | 2) Displacement Quality Assessment Index (20%) |
| | 3) Recovery Efficiency Indicator (20%) |
| | 4) Field Depletion Rate Index (20%) |
| | 5) Well Rate Design Index (10%) |
| | 6) Plateau Sustainability Index (10%) |

In Table 1, the Water Encroachment Index (WEI) is a measure of the uniformity of the water flood front advance in a reservoir with water flooding. Table 2 shows an example calculation of the WEI.

TABLE 2 example calculation of the WEI

| Category | Reservoir Management Design (20%) |
|---|---|
| Sub-category | Water Encroachment Index (WEI) (20%) |

WEI is a measure of the uniformity of waterflood front advance.
WEI = 0.5 * Areal Encroachment + 0.5 * Vertical Conformance * 100
Elements:
Areal Encroachment is a measure of the uniformity of waterflood front advance in the areal direction.
Vertical Conformance measures how well the water moves in the vertical direction.

Figure 7:
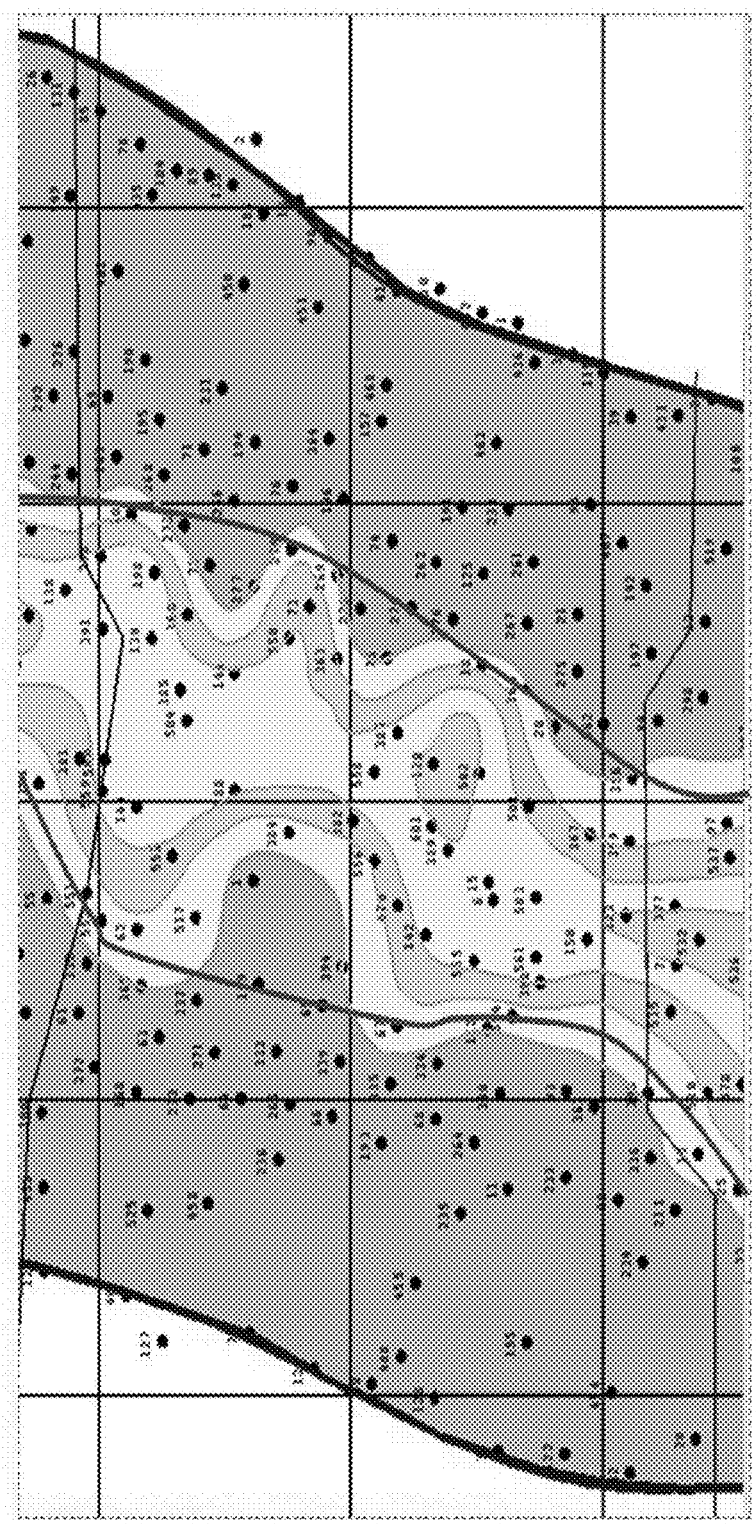
FIG. 7 shows an example net petroleum column map for a field according to an implementation.
Figure 8:
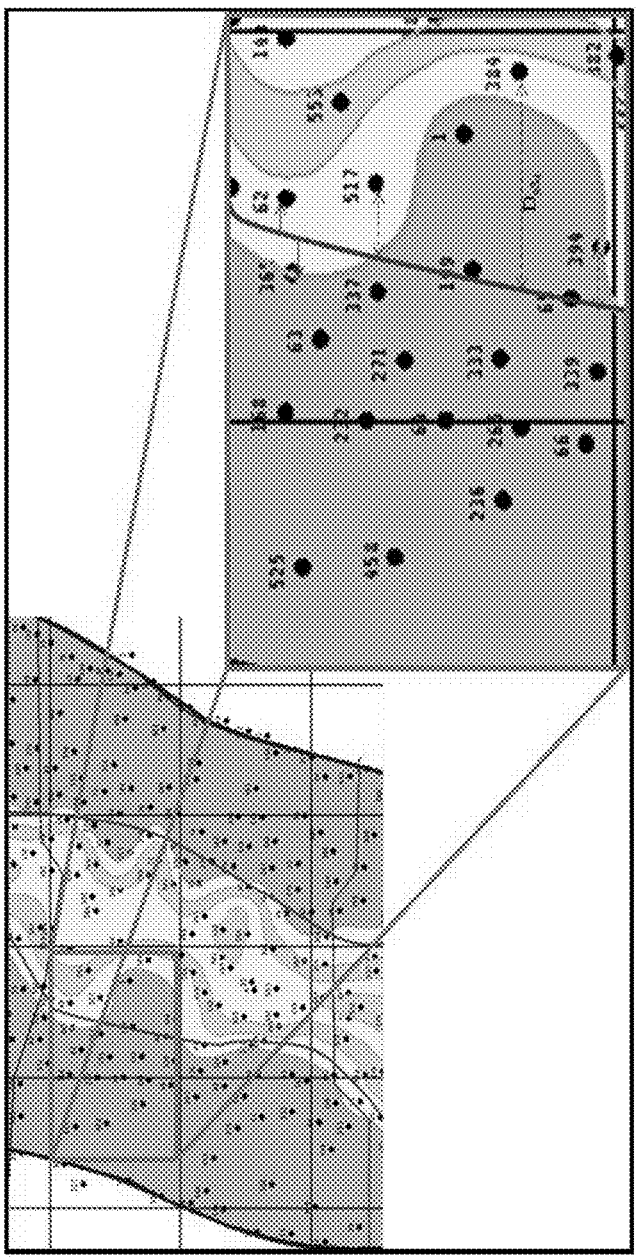
FIG. 8 shows an example zoomed-in view for a sector according to an implementation.
Figure 9:
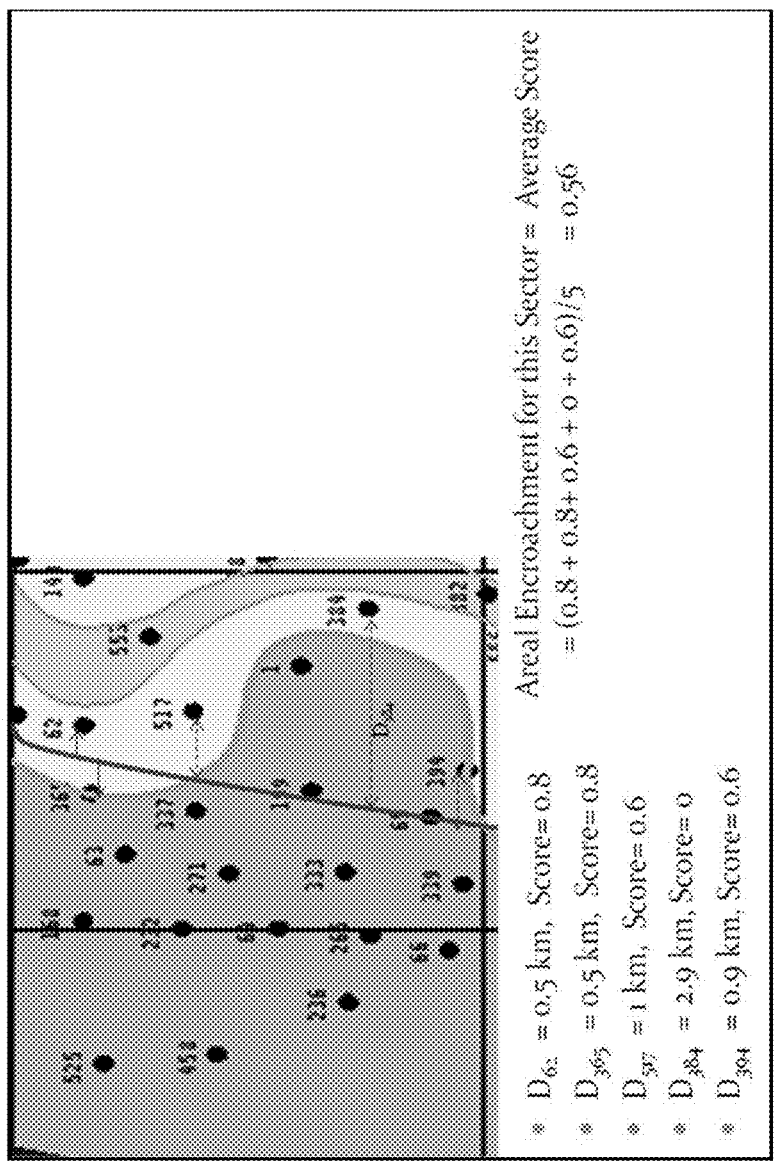
FIG. 9 shows an example areal encroachment score calculation map for a sector according to an implementation.

As shown in Table 2, WEI can be calculated as the sum of 50% areal encroachment and 50% vertical encroachment. The element can be a measure of the uniformity of the water flood front advance maps in the areal direction. Examples of the water flood front advance maps include Ghawar Field, net petroleum column map, or other maps that show the water flood front. FIGS. 7-9 and associated descriptions provide additional details for these implementations.

FIG. 7 shows an example net petroleum column map 700 for a field according to an implementation. As illustrated, the mean front of the first petroleum column, in this case the 30 to 60 feet petroleum, can be drawn manually or mathematically using map statistical tools. The map includes both the west flank and the east flank of the flood front.

FIG. 8 shows an example zoomed-in view 800 for a sector according to an implementation. As illustrated, the distance of each well to the mean flood front is calculated. Table 3 shows an example calculation of areal encroachment score for each well based on the distance to the mean flood front. For example, as shown in Table 3, for each well, an areal encroachment score may be obtained based on the distance between the well to the mean flood front. And the areal encroachment score for a group of wells, e.g., the wells in the first petroleum column in FIG. 7, may be calculated by taking the average score of the group of wells.

TABLE 3 example calculation of the areal encroachment score
Areal Encroachment Element

| Distance of Well to Mean Floodfront (km.) | Score |
|---|---|
| 0 | 1.0 |
| 0 to 0.6 | 0.8 |
| 0.61 to 1.20 | 0.6 |
| 1.21 to 1.8 | 0.4 |
| 1.81 to 2.40 | 0.2 |
| ≥2.41 | 0 |

FIG. 9 shows an example of the areal encroachment score calculation map 900 for a sector according to an implementation. The wells in the first petroleum column 30 feet to 60 feet updip to the peripheral injectors are considered. The distance of these wells to the mean front is measured, and score base on the distance is obtained from Table 3. The Areal Encroachment score is the average of all well's score. In the illustrated example, the areal encroachment score is 0.56.

Referring back to Table 2, Vertical Conformance measures the uniformity of the water movement in the vertical direction. The element can be obtained using the Master Surveillance Program key wells, which includes both strip wells and tie-in wells. In some cases, Vertical Conformance Element can be calculated based on the ratio of water contacted interval to Total interval and whether any bottom up sweep and no bypassed oil are observed. Table 4 shows an example Vertical Conformance element scoring table that can be used to calculate the Vertical Conformance element.

TABLE 4 example Vertical Conformance element scoring table
Vertical Conformance Element

| Key Well Vertical Conformance Element/Questions | Score |
|---|---|
| Ratio of Water contacted interval to Total interval * 0.5 | 0-0.5 |
| Logs indicate Bottom Up Sweep & No Bypassed Oil? | 0.5 |
| Logs indicate Water Over Oil & Bypassed Oil? | 0.0 |
| Vertical Conformance score for a Key well | Sum = 0-1 |
| Vertical Conformance is the average of all Key wells' scores. | 0-1 |

Referring back to Table 1, Displacement Quality Assessment Index (DQAI) evaluates the quality of the sources of the displacement efficiency, an integral part of recovery factor. Table 5 shows an example calculation of the DQAI. In some cases, the elements used in the calculation, e.g., Lab special core analysis (SCAL) Quality, Field residual oil saturation (ROS) Test Quality, and displacement efficiency (Ed) Analysis Quality, are based on subjective data.

TABLE 5 example calculation of the DQAI

| Category | Reservoir Management Design (20%) |
|---|---|
| Sub-category | Displacement Quality Assessment Index (20%) |

DQAI evaluates the quality of the sources of the displacement efficiency, an integral part of recovery factor.
DQAI = Lab SCAL Quality + Field ROS Test Quality + Ed Analysis Quality
Lab SCAL Quality assesses the quality of lab SCAL tests to obtain Swi and Sor.
Field ROS Test Quality assesses the quality of any field-conducted ROS tests.
Ed Analysis Quality assesses the integration of the Lab and Field tests.

Recovery Efficiency Indicator (REI) indicates optimized recovery efficiency. Table 6 shows an example calculation of the REI. For example, REI may be calculated based on the ratio between recovery factor and ideal recovery factor. The ideal recovery factor may be calculated based on connate or initial water saturation (Swc) and residual oil saturation (Sor).

TABLE 6 example calculation of the REI

| Category | Reservoir Management Design (20%) |
|---|---|
| Sub-category | Recovery Efficiency Indicator (20%) |

REI assesses the recovery efficiency, which is integral to the quality of the overall reservoir management design.
REI = Recovery Factor/Ideal Recovery Factor * 100
Recovery Factor is the projected recovery factor for the current recovery process.
Ideal Recovery Factor is the recovery factor at 100% volumetric sweep efficiency.
=Volumetric Sweep Efficiency * Displacement Efficiency
=Areal Sweep * Vertical Sweep * Movable Oil/Total Oil
=1.0 * 1.0 * ((1 − Swc − Sor)/(1 − Swc)) * 100

Field Depletion Rate (FDRI) indicates the ability of reaching the recovery target. Table 7 shows an example calculation of raw FDRI.

TABLE 7 example calculation of raw FDRI

| Category | Reservoir Management Design (20%) |
|---|---|
| Sub-category | Field Depletion Rate Index (20%) |

FDRI is a critical element since it impacts the ability of reaching our recovery target efficiently.
FDRI = Annual Production/Estimated Ultimate Oil Recovery * 100

Raw FDRI are converted to one of four scores according to Table 8. A depletion between 2 to 5% is an ideal depletion rate and, therefore, is assigned the higher score. Other rates are assigned lower scores.

TABLE 8 example conversion from raw FDRI to FDRI
Field Depletion Rate Index (FDRI)

| FDRI % | Score |
|---|---|
| <2 | 85 |
| 2 to 5 | 95 |
| 6 to 10 | 75 |
| >10 | 60 |

Well Rate Design Index (WRDI) indicates the designed well rates and pressure drawdowns. The pressure drawdowns are used to achieve the target recoveries, and maximize and sustain plateau production. The more methods used to arrive at the target design, the higher the score. Table 9 shows an example calculation of the WRDI.

TABLE 9 example calculation of the WRDI

| Category | Reservoir Management Design (20%) |
|---|---|
| Sub-category | Well Rate Design Index (10%) |

WRDI assesses the designed well rates & pressure drawdowns used to achieve the target recoveries and maximize & sustain plateau production. The more methods used to arrive at the target design, the higher the score.
WRDI = Simulation Guided Well Rates + Empirical Guided Well Rates + Analog Guided Well Rates The elements used in the calculation, e.g., Simulation Guided Well Rates, Empirical Guided Well Rates, and Analog Guided Well Rates, are based on subjective data. Table 10 shows an example scoring table for determining the WRDI.

TABLE 10 example scoring table for determining the WRDI
Well Rate Design Index (WRDI)

| Critical Elements/Questions | Score |
|---|---|
| Has Simulation studies been used to develop individual well drawdowns and well rates? | 0 to 40 |
| Has Empirical Calculations been used to develop individual well drawdowns and well rates? | 0 to 30 |
| Has Analogs been used to develop individual well drawdowns and well rates? | 0 to 30 |
| Well Rate Design Index (WRDI) | 0 to 100 |

Plateau Sustainability Index (PSI) assesses the creation of a sustained plateau of production in the design and, thus, is important to meeting recovery goals. PSI measures the length of the plateau that production is being designed. The longer the plateau in relation to the ultimate recovery results in a higher score. Table 11 shows an example calculation of PSI.

TABLE 11 example calculation of PSI
Plateau Sustainability Index (PSI)

| Recovery Factor @ Decline Onset % | Score |
|---|---|
| >50 | 95 |
| 40 to 50 | 85 |
| 30 to 40 | 75 |
| <30 | 60 |

The modeling and predictive capability assessment category includes the following 3 sub-categories:

1. Geological Model Quality Index (40%)
2. Simulation Model Quality Index (40%)
3. Simulation Model Utilization Index (20%)

The modeling and predictive capability assessment sub-index can indicate how well the reservoirs are modeled in predicting the hydrocarbon exploitation of reservoirs and recoverable petroleum.

Geological Model Quality Index (GMQI) can indicate how well the geology ("the Container") is characterized. Table 12 shows an example calculation of GMQI.

TABLE 12 example calculation of GMQI

| Category | Model & Predictive Capability Assessment (20%) |
|---|---|
| Sub-category | Geological Model Index (40%) |

GMQI covers how well we characterize the geology ("the Container") so we can adequately model our reservoirs to predict the hydrocarbon recoveries in our reservoirs.
GMQI = Core Data Sufficiency & Coverage + Stratification, Facies, & Other Geological Features + Fracture & Faults Modeling + Conditioning to Pressure Buildup & Pressure Falloff KH + Capturing of Porosity & Permeability in Non-Well Areas (see table)

Table 13 shows an example score table of each element for calculating GMQI.

TABLE 13 example score table for calculating GMQI
Geological Model Quality Index (GMQI)

| Elements | Score |
|---|---|
| Core Data Quality, Sufficiency, & Coverage | 0 to 20 |
| Stratification, Facies, & other Geological features | 0 to 20 |
| Fracture & Faults Modeling (No; Yes) | 0; 20 |
| Conditioning to Pressure Buildup and Falloff KH (No; Yes) | 0; 20 |
| Capturing distribution of Porosity & Permeability | 0 to 20 |
| Geological Model Quality Index (GMQI) | 0 to 100 |

Simulation Model Quality Index (SMQI) indicates how well the reservoirs are modeled to predict the hydrocarbon recoveries in the reservoirs. Table 14 and 15 show an example calculation of SMQI and an example score table of each element for calculating SMQI.

TABLE 14 example calculation of SMQI

| Category | Model & Predictive Capability Assessment (20%) |
|---|---|
| Sub-category | Simulation Model Quality Index (40%) |

SMQI covers how well we model our reservoirs to predict the hydrocarbon recoveries in our reservoirs.
SMQI = Geological Model Upscaling Quality + SCAL Kr, Pc Quality, Sufficiency, & Reservoir Coverage + PVT Quality, Sufficiency, & Reservoir Coverage + Pressure History Match Quality + Water Arrival/Water Cut History Match Quality (see table)

TABLE 15 an example score table for calculating SMQI
Simulation Model Quality Index (SMQI)

| Elements | Score |
|---|---|
| Geological Model Upscaling Quality | 0 to 20 |
| relative permeability from special core analysis (SCAL Kr), Pc Quality, Sufficiency, & Reservoir Coverage | 0 to 20 |
| pressure, volume, & temperature (PVT) Quality, Sufficiency, Reservoir Coverage | 0 to 20 |
| Pressure History Match Quality | 0 to 20 |
| Water Arrival/Water Cut History Match Quality | 0 to 20 |
| Simulation Model Quality Index (SMQI) | 0 to 100 |

Simulation Model Utilization Index (SMUI) indicates the level of simulation use and influence in the Operating Plans and Business Plans. Table 16 shows an example calculation of SMUI.

TABLE 16 example calculation of SMUI

| Category | Model & Predictive Capability Assessment (20%) |
|---|---|
| Sub-category | Simulation Model Utilization Index (20%) |

SMUI covers the level of Simulation Model Use & Influence in our Operating Plans as well as in our Business Planning.
SMUI = Level of Simulation Use & Influence in our Operating Plans and Business Plans (%)

The development and operation sub-index can indicate how well the optimized development and operation of the reservoirs are planned and executed. The development and operation category includes the following 6 sub-categories:

1. Operating Plan Achievement index (40%)
2. Field productivity efficiency index (13%)
3. Pressure management index (13%)
4. Gas management index (13%)
5. Water management index (13%)
6. Drawdown management index (8%)

The Operating Plan Achievement Index (OPAI) indicates how well the Operating Plan is complied. Table 17 shows an example scoring table and calculation of OPAI.

TABLE 17 example scoring and calculation table of OPAI
Operating Plan Achievement Index (OPAI)

| Elements | Score |
|---|---|
| MP Drilling Achievement/Planned | 0 to 100 |
| Well Production Rate & Priority Compliance | 0 to 100 |
| Well Injection Rate Compliance | 0 to 100 |
| Injection/Production Ratio (IPR) Compliance | 0 to 100 |
| Well Services Requirement Compliance Logging (C/O, PNL, PLT, PLT(G)) | 0 to 100 |
| Well Services Requirement Compliance Static Bottomhole Pressure (SBHP) | 0 to 100 |
| Well Services Requirement Compliance PI/II | 0 to 100 |
| Well Services Requirement Compliance Rate Tests | 0 to 100 |
| % of MSC as Locked Potential | 0 to 100 |
| % of MSC Required Injection as Locked Potential | 0 to 100 |
| % Plant Loading as Gas Locked Potential | 0 to 100 |
| Operating Plan Achievement Index (OPAI) | Sum/11 |

Table 18 shows an example scoring table to obtain the last 3 elements on locked potential, e.g., % of maintain potential capacity (MSC) as locked potential, % of MSC required injection as locked potential, and % plant loading as gas locked potential. These elements can have the highest score if locked potential as a percent of MSC is 0.

TABLE 18 example scoring table for locked potential elements
Operating Plan Achievement Index (OPAI)

| % of MSC as Locked Potential or % of MSC Required Injection as Locked Potential or % of Plant Loading as Gas Locked Potential | Score |
|---|---|
| 0 | 100 |
| 5 | 83.5 |
| 10 | 66.7 |
| 15 | 50.34 |
| 20 | 34 |
| 25 | 16.7 |
| >30 | 0 |

Field Productivity & Injectivity Efficiency Index (FPIEI) evaluates the aggregate well productivity and injectivity. These measures are important in assessing whether optimal petroleum production and water injection are achieved. Table 19 shows an example calculation of FPIEI.

TABLE 19 example calculation of FPIEI

| Category | Development & Operation Plan (25%) |
|---|---|
| Sub-category | Field Productivity/Injectivity Efficiency Index (10%) |

FPIEI evaluates the aggregate well productivity and injectivity, which is quite important in the assessment whether optimal oil production and water injection are achieved.
FPIEI = (Actual aggregate Wells PI/Ideal or Targeted aggregate Wells PI) * 50 + (Actual aggregate Wells II/Ideal or Targeted aggregate Wells II) * 50

Pressure Management Index (PMI) assesses reservoir pressure maintenance. Table 20 shows an example calculation of PMI.

TABLE 20 example calculation of PMI

| Category | Development & Operation Plan (25%) |
|---|---|
| Sub-category | Pressure Management Index (15%) |

PMI assesses reservoir pressure maintenance, which is a critical element of Reservoir Management.
PMI = (Actual Average Reservoir Pressure/Target Average Reservoir Pressure) * % Target IPR Achieved * IPR Distribution Efficiency In some cases, gas production associated with petroleum production can be minimized to maximize petroleum production and recovery. Gas Management Index (GMI) measures the change in GOR over time, the fraction of petroleum wells below solution gas to oil ratio (GOR), and wells exhibiting high GOR. The sum of these 3 elements can measure the severity of the gas management problem. A score of 100% indicates that solution GOR is not exceeded. Table 21 shows an example calculation of GMI.

TABLE 21 example calculation of GMI

| Category | Development & Operation Plan (25%) |
|---|---|
| Sub-category | Gas Management Index (10%) |

Gas production coming from evolution from oil needs to be minimized to maximize oil production & recovery. GMI measures the change in GOR over time, the fraction of oil wells below solution GOR, and well exhibiting high GOR. The sum of these three measures the severity of the gas management problem. Never exceeding solution GOR yields a score of 100%.
GMI = (1 − Annual GOR rate of change) * 33.3 + (Fraction of Wells below Solution GOR) * 33.3 + (1 − Fraction of Wells SI due to high GOR) * 33.4

Water Management Index (WMI) can indicate how well water production is minimized. Tables 22 and 23 show an example calculation of WMI and an example scoring table of WMI. For example, WMI can be calculated based on water cut (WC) rate of change. In some cases, WC represents the ratio between the water production rate and the total liquid production rate, where the total liquid production rate includes the water production rate and the oil production rate. As shown, a low WMI may yield a high score. A high WMI that is greater than 2 may yield a low score of 60.

TABLE 22 example calculation of WMI

| Category | Development & Operation Plan (25%) |
|---|---|
| Sub-category | Water Management Index (15%) |

WMI covers how well we minimize water production, which is critical to Reservoir Management.
WMI = Score corresponding to WC rate of change for the year = Average WC at end of year − Average WC at beginning of year (see table)

TABLE 23 example scoring table of WMI
Water Management Index (WMI)

| WMI | Score |
|---|---|
| <1 | 95 |
| 1-1.5 | 85 |
| 1.5-2 | 75 |
| >2 | 60 |

Drawdown Management Index (DMI) can indicate how well the pressure drawdown is kept to an acceptable limit. Tables 24 and 25 show an example calculation of DMI and an example scoring table of DMI.

TABLES 24 example calculation of DMI

| Category | Development & Operation Plan (25%) |
|---|---|
| Sub-category | Drawdown Management Index (10%) |

DMI covers how well we keep pressure drawdown to acceptable limits, which is critical to Reservoir Management.
DMI = % of Wells operating with Drawdowns and Well Rates within 10% of the Design Limit (see table)

TABLES 25 example scoring table of DMI
Drawdown Management Index (DMI)

| Critical Element | Score |
|---|---|
| % of wells operating with drawdowns and well rates within 10% of the design limit | 0-100 |
| DMI | 0-100 |

The reservoir surveillance sub-index can indicate how well the reservoirs are monitored for plan and model corrections and updates. The reservoir surveillance category includes the following 2 sub-categories:

1. Surveillance Plan design index (50%)
2. Surveillance Plan implementation index (50%)

Surveillance Plan Design Index (SPDI) can indicate the existence and effect of a master surveillance plan for assessing reservoir management design. A master surveillance plan is an important element in validating the original design and improving the current performance of the reservoirs. SPDI can be calculated based on answers to five yes-or-no questions. A "yes" returns a score of 100 and a "no" returns a score of 0. Table 26 shows an example scoring and calculation of SPMI.

TABLE 26 example scoring and calculation table of SPMI
Surveillance Plan Design Index (SPDI)

| Elements/Critical Questions | Score |
|---|---|
| Is there a Master Surveillance Plan? No; Yes | 0; 100 |
| Key wells for water saturation (Sw) and static bottomhole pressure (SBHP) measurements & frequency defined? No; Yes | 0; 100 |
| Well production/injection rate tests measurements & frequency defined? No; Yes | 0; 100 |
| Procurement of PVT, Core, & SCAL data considered in the plan? No; Yes | 0; 100 |
| Are new testing and surveillance technologies considered in the plan? No; Yes | 0; 100 |
| Surveillance Plan Design Index (SPDI) | (0 to 100)/5 |

Surveillance Plan Implementation Index (SPII) can indicate the degree to which a surveillance plan is implemented. SPII can provide a measure of the quality of efforts being applied to manage the reservoir and the likelihood of the recovery design and production plan of being achieved. SPII can be calculated based on answers to a yes-or-no question and three percentage questions that range from 0 to 100. Table 27 shows an example scoring and calculation of SPII.

TABLE 27 example scoring and calculation table of SPII
Surveillance Plan Implementation Index (SPII)

| Elements/Critical Questions | Score |
|---|---|
| Is the Master Surveillance Plan reviewed & updated annually? No; Yes | 0; 100 |
| What percent of Sw & SBHP key wells were utilized as planned? | 0 to 100 |
| What percent of production/injection rate tests measurement events were conducted as planned? | 0 to 100 |
| What percent of Core, & SCAL data were completed vs. planned? | 0 to 100 |
| Surveillance Plan Implementation Index (SPII) | (0 to 100)/4 |

The technology application sub-index can indicate how well up-to-date technologies are used. The technology application category includes the following 4 sub-categories:
1. Drilling technology index (15%)
2. Completion technology index (35%)
3. Stimulation technology index (15%)
4. Reservoir Dynamics technology index (35%)

Drilling Technology Index (DTI) indicates the advancement in drilling technology that has benefitted Reservoir Management. Multilateral and MRC wells are examples resulting from these technology improvements. Table 28 shows an example scoring and calculation of DTI. DTI can be calculated based on answers to 3 yes-no questions and an assessment question on drilling technology utilization. The answer to the assessment question may be subjective.

TABLE 28 example scoring and calculation table of DTI
Drilling Technology Index (DTI)

| Elements/Critical Questions | Score |
|---|---|
| Have alternate drilling technologies been evaluated within the last 3 years? No; Yes | 0; 20 |
| Have alternate drilling technologies been field tested within the last 3 years? No; Yes | 0; 20 |
| Have alternate drilling technologies been deployed within the last 3 years? No; Yes | 0; 20 |
| Are the drilling technologies fit for purpose? | 0 to 40 |
| Drilling Technology Index (DTI) | (0 to 100) |

Completion Technology Index (CTI) can indicate the advancement in the completion technology. Equalizers and Smart Wells are examples resulting from these technology improvements. Table 29 shows an example scoring and calculation of CTI. CTI can be calculated based on answers to 3 yes-no questions and an assessment question on completion technology utilization. The answer to the assessment question may be subjective.

TABLE 29 example scoring and calculation table of CTI
Completion Technology Index (CTI)

| Elements/Critical Questions | Score |
|---|---|
| Have alternate completion technologies been evaluated within the last 3 years? No; Yes | 0; 20 |
| Have alternate completion technologies been field tested within the last 3 years? No; Yes | 0; 20 |
| Have alternate completion technologies been deployed within the last 3 years? No; Yes | 0; 20 |
| Are the completion technologies fit for purpose? | 0 to 40 |
| Completion Technology Index (CTI) | (0 to 100) |

Stimulation Technology Index (STI) can indicate the improvements that have been made in the stimulation technology. New acid stimulation of horizontal wells is an example resulting from stimulation technology improvements. Table 30 shows an example scoring and calculation of STI. STI can be calculated based on answers to 3 yes-no questions and an assessment question on stimulation technology utilization. The answer to the assessment question may be subjective.

TABLE 30 example scoring and calculation table of STI
Stimulation Technology Index (STI)

| Elements/Critical Questions | Score |
|---|---|
| Have alternate stimulation technologies been evaluated within the last 3 years? No; Yes | 0; 20 |
| Have alternate stimulation technologies been field tested within the last 3 years? No; Yes | 0; 20 |
| Have alternate stimulation technologies been deployed within the last 3 years? No; Yes | 0; 20 |
| Are the stimulation technologies fit for purpose? | 0 to 40 |
| Stimulation Technology Index (STI) | (0 to 100) |

Reservoir Dynamics Technology Index (RDTI) can indicate the improvements that have been made in the reservoir dynamics technology. New technologies in formation evaluation, reservoir characterization, forecasting, surveillance, and testing are examples resulting from reservoir dynamics technology improvements. Table 31 shows an example scoring and calculation of RDTI. RDTI can be calculated based on answers to 3 yes-no questions and an assessment question on reservoir dynamics technology utilization. The answer to the assessment question may be subjective.

TABLE 31 example scoring and calculation table of RDTI
Reservoir Dynamics Technology Index (RDTI)

| Elements/Critical Questions | Score |
|---|---|
| Have alternate reservoir dynamics technologies been evaluated within the last 3 years? No; Yes | 0; 20 |
| Have alternate reservoir dynamics technologies been field tested within the last 3 years? No; Yes | 0; 20 |
| Have alternate reservoir dynamics technologies been deployed within the last 3 years? No; Yes | 0; 20 |
| Are the reservoir dynamics technologies fit for purpose? | 0 to 40 |
| Reservoir Dynamics Technology Index (RDTI) | (0 to 100) |

The knowledge management sub-index can indicate how well data and knowledge are documented, archived, and obtained. A well-managed knowledge base can be available at any moment for technology transfer. Lessons learned from the past and current operations can be passed on for better planning and execution. The knowledge management category includes the following 2 sub-categories:
1. Knowledge management index (60%)
2. Experience transfer index (40%)

Knowledge Management Index (KMI) measures a department's commitment to sharing knowledge, the acquisition of quality data, its access, and utilization. KMI also indicates how reservoir performance is analyzed and documented, and how reservoir depletion strategies are updated and documented. Table 32 shows an example scoring and calculation of KMI. KMI can be calculated based on answers to 4 yes-no questions.

TABLE 32 example scoring and calculation table of KMI
Knowledge Management Index (KMI)

| Elements/Critical Concerns | Score |
|---|---|
| Data sources are accessible and easy to use. Real time I-Field data acquisition and availability. No; Yes | 0; 25 |
| Are the Reservoir Performance analyzed and documented? No; Yes | 0; 25 |
| Is the Reservoir Depletion Strategy documented and updated annually? No; Yes | 0; 25 |
| Level of Studies & Documentation- All studies are well documented, archive and easily accessible. No; Yes | 0; 25 |
| Knowledge Management Index (KMI) | (0 to 100) |

Experience Transfer Index (ETI) measures the workload assigned to each reservoir engineer in terms of number of wells. Too many wells may result in neglect and inadequate resources to evaluate well and reservoir performance. In some cases, 40 to 50 wells per reservoir engineer are deemed to be adequate. This sub-category also considers the number of PDP engineers assigned to each senior engineer for adequate hands-on job training for the PDP engineer. ETI can be calculated by summing the wells per engineer score and the PDP to engineer score. Each score makes up 50% of the ETI. Tables 32 shows an example scoring table of Wells per Engineer scores. Tables 33 shows an example scoring table of PDP per Senior Engineer Ratio scores.

TABLES 32 example scoring table of Wells per Engineer score
Experience Transfer Index (ETI)
Wells Per Engineer Element

| Wells per Engineer | Score |
|---|---|
| >100 | 50 |
| 71-100 | 60 |
| 51-70 | 80 |
| 40-50 | 100 |
| <40 | 80 |

TABLES 33 example scoring table of PDP per Senior Engineer Ratio score
Experience Transfer Index (ETI)
PDP per Senior Engineer Ratio Element

| PDP per Senior Engineer | Score |
|---|---|
| >3 | 50 |
| 2.1 to 3 | 75 |
| 1.5 to 2 | 100 |
| 1 to 1.4 | 80 |
| <1 | 60 |

Referring back to FIG. 2, from 206, method 200 proceeds to 208.

At 208, a reservoir health sub-index is determined to be below a predetermined threshold. In some cases, the threshold is determined by a reservoir manager. In some cases, a threshold can be set for each reservoir health sub-index. In these or other cases, each reservoir health sub-index can be compared with the threshold that corresponds to the reservoir health sub-index. In some cases, more than one threshold can be set for each reservoir health sub-index. In some cases, the thresholds are stored in a database. The RHDI server can retrieve the thresholds from the database and compare the thresholds with the corresponding indices. From 208, method 200 proceeds to 210.

At 210, an alert is generated in response to the determination that a reservoir health sub-index is below the corresponding threshold. In some cases, the alert can be generated if at least one of the pluralities of the reservoir health sub-indices is below the corresponding threshold. In some cases, if more than one reservoir health sub-index is below the corresponding thresholds, multiple alerts for the reservoir can be generated.

In some cases, different levels of alerts can be generated based on more than one threshold. For example, two thresholds, e.g., 50% and 70%, can be set for a reservoir health sub-index. If the reservoir health sub-index is below 70% but greater than 50%, an amber alert is generated. If the reservoir health sub-index is below 50%, a red alert is generated. From 210, method 200 proceeds to 212.

At 212, the alert and a cause are sent to the client. In some cases, the alert can include an indication that indicates the level of the alert. For example, the indication can be set to "0" to indicate a red alert and "1" to indicate an amber alert. The cause can indicate the reason of alert. For example, the cause can include the reservoir health sub-index that is below the predetermined threshold. The cause can also include the sub-category indices and related reservoir diagnostic data that contribute to the reservoir health sub-index being below the predetermined threshold.

In some cases, the alert and the cause can be displayed at the RHDI client. For example, the RHDI client can display an alert chart that shows the alerts received from the RHDI server. FIG. 5 illustrates an example display of an alert chart 500 according to an implementation. As illustrated, the alert chart 500 includes the alerts issued for 6 reservoirs. As illustrated, the alert chart 500 includes the levels of alerts that are issued by the RHDI server for these reservoirs. The alert chart 500 also includes the reservoir health sub-index that triggers the alert. The alert chart 500 further includes underlying causes of each alert. For example, for the amber alert of reservoir 3, the alert chart 500 indicates that ETI triggers the alert. The alert chart 500 further indicates that a high score of 160 for Wells per Engineer and a low score of 0.4 for PDP per Senior Engineer are the underlying reasons that cause the alert.

In some cases, historical data can be compared to track the reservoir health over time. Referring back to FIG. 2, from 212, method 200 proceeds to 214, where a previously computed reservoir health sub-index of the reservoir is retrieved. In some cases, the previously calculated RHDIs, the reservoir health sub-indices, and the sub-category indices can be stored in a database. The RHDI server can retrieve these previously calculated indices and compare with the currently calculated indices. From 214, method 200 proceeds to 216.

At 216, a difference between a computed reservoir health sub-index and the previously computed reservoir health sub-index can be calculated. From 216, method 200 proceeds to 218.

Figure 6:
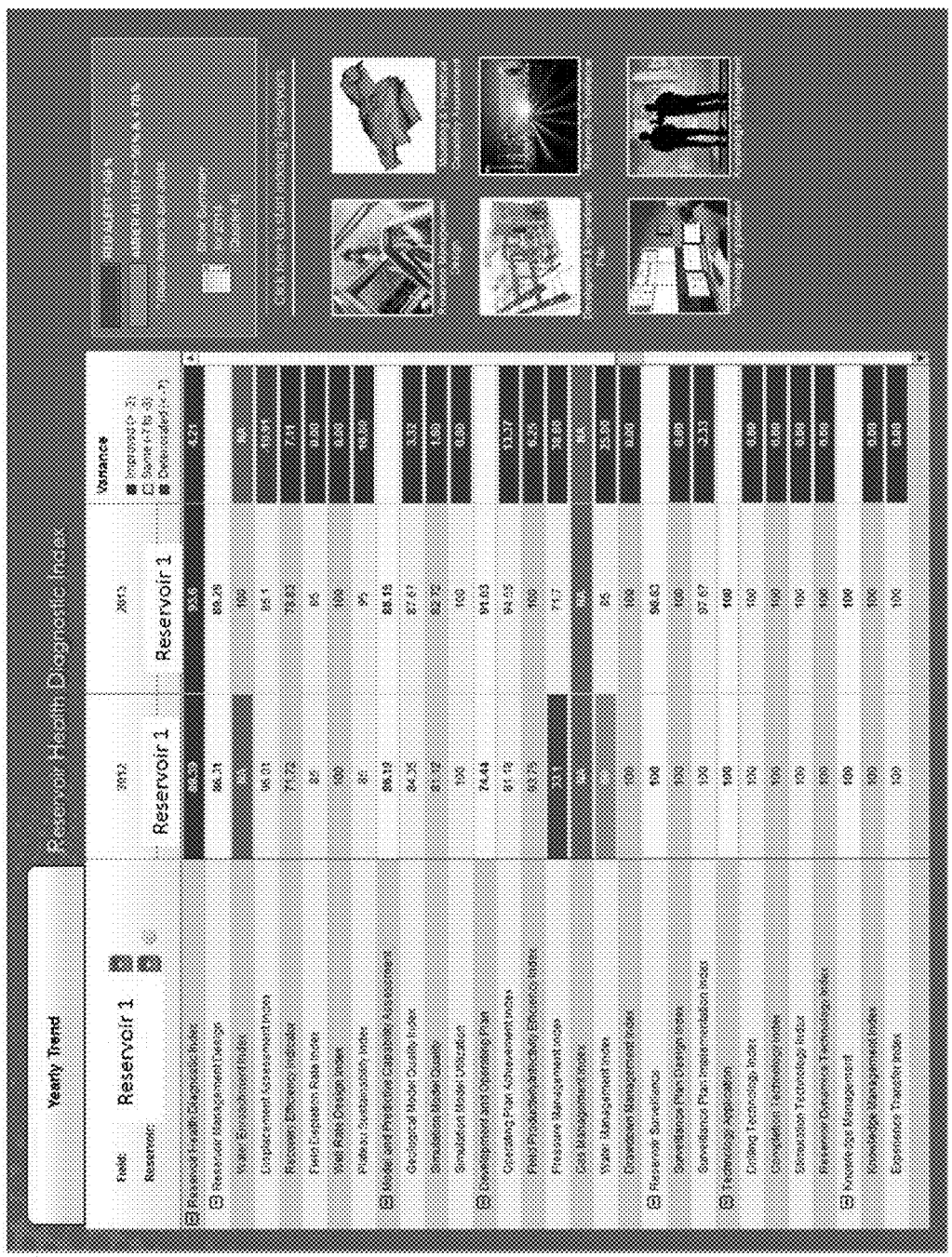
FIG. 6 illustrates an example display of a trend chart according to an implementation.

At 218, the difference is sent to the client. In some cases, the difference can be displayed at the RHDI client. For example, the RHDI client can display a trend chart that shows the differences of the indices. FIG. 6 illustrates an example display of a trend chart 600 according to an implementation. As illustrated, the trend chart 600 includes a comparison of the indices between the year 2012 and the 2013 for the same reservoir. As illustrated, the trend chart 600 shows that the RHDI has increased by 4.21, from 83.3 in the year 2012 to 93.6 in the year 2013. The trend chart 600 also shows each sub-index and sub-category index and their respective differences between the years. In some cases, as shown in FIG. 6, the indices and the differences can be color coded to indicate different levels of changes. For example, if an index improves by 3, a blue color is used. If an index deteriorates by 7, a red color is used. If an index stays in the same range, e.g., between −7 to 3, a yellow color is used. This approach helps a user to quickly identify the changes of the reservoir health over time.

Figure 3:
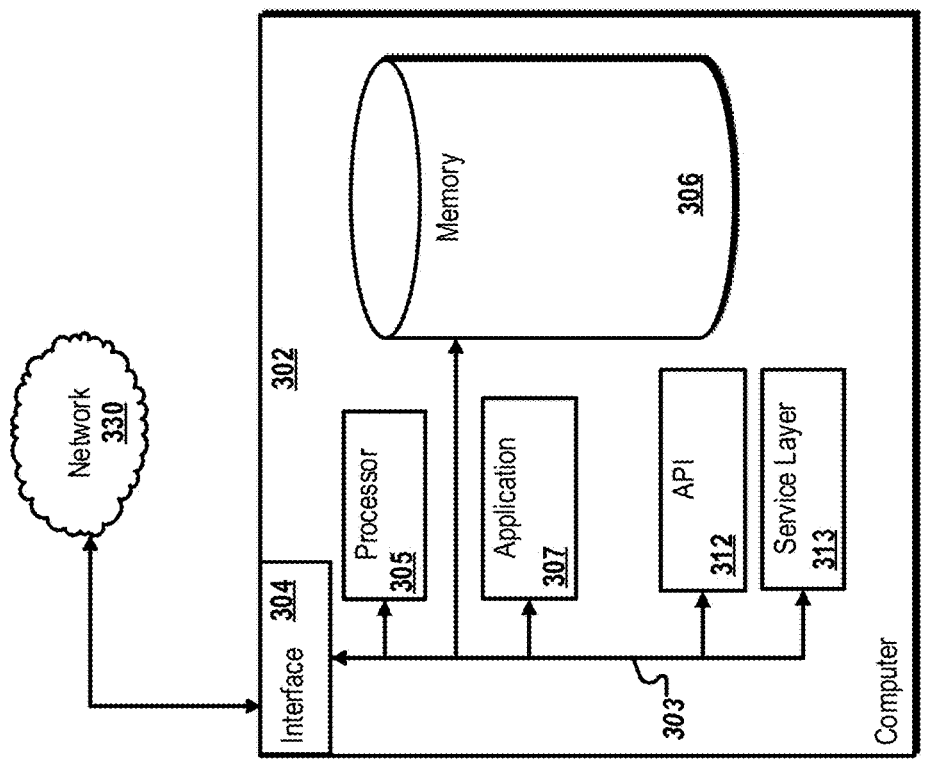
FIG. 3 is a high-level architecture block diagram of a computer used in a reservoir health diagnosis data processing system according to an implementation.

FIG. 3 is a high-level architecture block diagram of an example computer system 300 used in the RHDI system 100 according to an implementation. At a high level, the illustrated computer system 300 includes a reservoir health diagnosis data processing computer 302 (computer 302) that is communicably coupled with a network 330. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The computer 302 includes a computing system configured to diagnose reservoir health. In some cases, the algorithm of the reservoir health diagnosis process can be implemented in an executable computing code, e.g., C/C++ executable codes. Alternatively or in combination, the algorithm of the reservoir health diagnosis process can be implemented in an application program, e.g., EXCEL. In some cases, the computer 302 can include a standalone Linux system that runs batch applications. In some cases, the computer 302 can include mobile or personal computers that run the application program.

The computer 302 may comprise a computer that includes an input device, such as a keypad, keyboard, touch screen, microphone, speech recognition device, other device that can accept user information, and/or an output device that conveys information associated with the operation of the computer 302, including digital data, visual and/or audio information, or a GUI.

The computer 302 can serve as a client, network component, a server, a database or other persistency, and/or any other component of the computer system 300. In some implementations, one or more components of the computer 302 may be configured to operate within a cloud-computing-based environment.

At a high level, the computer 302 is an electronic computing device operable to receive, transmit, process, store, or manage data and information associated with the system 300. According to some implementations, the computer 302 may also include or be communicably coupled with an application server, e-mail server, web server, caching server, streaming data server, business intelligence (BI) server, and/or other server.

The computer 302 can receive requests over network 330 from a client application (e.g., executing on another computer 302) and respond to the received requests by processing the said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 503. In some implementations, any and/or all the components of the computer 302, both hardware and/or software, may interface with each other and/or the interface 304 over the system bus 303 using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302 and/or the computer system 300. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302 and/or computer system 300. Moreover, any or all parts of the API 312 and/or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302 and/or computer system 300. The interface 304 is used by the computer 302 for communicating with other systems in a distributed environment—including within the computer system 300—connected to the network 330 (whether illustrated or not). Generally, the interface 304 comprises logic encoded in software and/or hardware in a suitable combination and operable to communicate with the network 330. More specifically, the interface 304 may comprise software supporting one or more communication protocols associated with communications such that the network 330 or interface's hardware is operable to communicate physical signals within and outside of the illustrated system 300.

The computer 302 includes a processor 305. Although illustrated as a single processor 305 in FIG. 3, two or more processors may be used according to particular needs, desires, or particular implementations of the computer 302 and/or the computer system 300. Generally, the processor 305 executes instructions and manipulates data to perform the operations of the computer 302. Specifically, the processor 305 executes the functionality required for diagnosing reservoir health.

The computer 302 also includes a memory 306 that holds data for the computer 302 and/or other components of the computer system 300. Although illustrated as a single memory 306 in FIG. 3, two or more memories may be used according to particular needs, desires, or particular implementations of the computer 302 and/or the computer system 300. While memory 306 is illustrated as an integral component of the computer 302, in alternative implementations, memory 306 can be external to the computer 302 and/or the computer system 300.

The application 307 is an algorithmic software engine providing functionality according to particular needs, desires, or particular implementations of the computer 302 and/or the computer system 300, particularly with respect to functionality required for diagnosing reservoir health. For example, application 307 can serve as one or more components/applications described in FIGS. 1-2, 4, 5A-5B, 6A-6B, and 7-9. Further, although illustrated as a single application 307, the application 307 may be implemented as multiple applications 307 on the computer 302. In addition, although illustrated as integral to the computer 302, in alternative implementations, the application 307 can be external to the computer 302 and/or the computer system 300.

There may be any number of computers 302 associated with, or external to, the computer system 300 and communicating over network 330. Further, the terms "client," "user," and other appropriate terminology may be used interchangeably as appropriate without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method for diagnosing reservoir health, comprising:
receiving, at a server from a client device, a plurality of reservoir diagnostic data associated with a reservoir;
computing, by a hardware processor at the server, a plurality of reservoir health sub-indices based on the plurality of the reservoir diagnostic data;

computing, by the hardware processor at the server, a reservoir health diagnostic index based on the plurality of reservoir health sub-indices and a predetermined category weighting factor;

determining, by the hardware processor at the server, that a reservoir health sub-index is below a predetermined threshold;

in response to the determining, generating, by the hardware processor at the server, an alert;

assigning, by the hardware processor at the server, a color code for the alert based on the reservoir health sub-index;

sending, to the client device, the alert, the color code, and a cause, wherein the cause indicates a reason that contributes to the reservoir health sub-index being below the predetermined threshold, and the alert is displayed at the client device using the color code;

retrieving a previously computed reservoir health sub-index of the reservoir;

calculating a difference between a computed reservoir health sub-index and the previously computed reservoir health sub-index; and sending the difference to the client device.

2. The computer-implemented method of claim 1, wherein the cause is displayed at the client device.

3. The computer-implemented method of claim 1, wherein the plurality of the reservoir diagnostic data are received from the client device over a communication network.

4. The computer-implemented method of claim 1, wherein the generating the alert comprises:
when the reservoir health sub-index is below a first predetermined threshold and is above a second predetermined threshold, generating a first level of alert; and
when the reservoir health sub-index is below the second predetermined threshold, generating a second level of alert.

5. The computer-implemented method of claim 1, wherein the plurality of reservoir health sub-indices comprises at least one of a reservoir management design sub-index, a modeling and predictive capability assessment sub-index, a development and operation plan sub-index, a reservoir surveillance sub-index, a technology application sub-index, or a knowledge management sub-index.

6. The computer-implemented method of claim 1, wherein computing each of the plurality of reservoir health sub-indices further comprises:
computing a plurality of sub-category indices based on the plurality of the reservoir diagnostic data; and
computing the reservoir health sub-index based on the plurality of sub-category indices and a predetermined sub-category weighting factor.

7. A system, comprising:
a memory; and
at least one hardware processor interoperably coupled with the memory and configured to:
receive, at a server from a client device, a plurality of reservoir diagnostic data associated with a reservoir;
compute, at the server, a plurality of reservoir health sub-indices based on the plurality of the reservoir diagnostic data;
compute a reservoir health diagnostic index based on the plurality of reservoir health sub-indices and a predetermined category weighting factor;
determine that a reservoir health sub-index is below a predetermined threshold;
in response to the determining, generate an alert;
assign a color code for the alert based on the reservoir health sub-index
send, to the client device, the alert, the color code, and a cause, wherein the cause indicates a reason that contributes to the reservoir health sub-index being below the predetermined threshold, and the alert is displayed at the client device using the color code;
retrieve a previously computed reservoir health sub-index of the reservoir;
calculate a difference between a computed reservoir health sub-index and the previously computed reservoir health sub-index; and
send the difference to the client device.

8. The system of claim 7, wherein the cause is displayed at the client device.

9. The system of claim 7, wherein the plurality of the reservoir diagnostic data are received from the client device over a communication network.

10. The system of claim 7, wherein the generating the alert comprises:
when the reservoir health sub-index is below a first predetermined threshold and is above a second predetermined threshold, generating a first level of alert; and
when the reservoir health sub-index is below the second predetermined threshold, generating a second level of alert.

11. The system of claim 7, wherein the plurality of reservoir health sub-indices comprises at least one of a reservoir management design sub-index, a modeling and predictive capability assessment sub-index, a development and operation plan sub-index, a reservoir surveillance sub-index, a technology application sub-index, or a knowledge management sub-index.

12. The system of claim 7, wherein computing each of the plurality of reservoir health sub-indices further comprises:
computing a plurality of sub-category indices based on the plurality of the reservoir diagnostic data; and
computing the reservoir health sub-index based on the plurality of sub-category indices and a predetermined sub-category weighting factor.

13. A non-transitory, computer-readable medium storing computer-readable instructions, the instructions executable by a computer and configured to:
receive, at a server from a client device, a plurality of reservoir diagnostic data associated with a reservoir;
compute, at the server, a plurality of reservoir health sub-indices based on the plurality of the reservoir diagnostic data;
compute a reservoir health diagnostic index based on the plurality of reservoir health sub-indices and a predetermined category weighting factor;
determine that a reservoir health sub-index is below a predetermined threshold;
in response to the determining, generate an alert;
assign a color code for the alert based on the reservoir health sub-index;
send, to the client device, the alert, the color code, and a cause, wherein the cause indicates a reason that contributes to the reservoir health sub-index being below the predetermined threshold, and the alert is displayed at the client device using the color code;
retrieving a previously computed reservoir health sub-index of the reservoir;
calculating a difference between a computed reservoir health sub-index and the previously computed reservoir health sub-index; and
sending the difference to the client device.

14. The medium of claim 13, wherein the cause is displayed at the client device.

15. The medium of claim 13, wherein the plurality of the reservoir diagnostic data are received from the client device over a communication network.

16. The medium of claim 13, wherein the generating the alert comprises:
   when the reservoir health sub-index is below a first predetermined threshold and is above a second predetermined threshold, generating a first level of alert; and
   when the reservoir health sub-index is below the second predetermined threshold, generating a second level of alert.

17. The medium of claim 13, wherein the plurality of reservoir health sub-indices comprises at least one of a reservoir management design sub-index, a modeling and predictive capability assessment sub-index, a development and operation plan sub-index, a reservoir surveillance sub-index, a technology application sub-index, or a knowledge management sub-index.

18. The medium of claim 13, wherein computing each of the plurality of reservoir health sub-indices further comprises:
   computing a plurality of sub-category indices based on the plurality of the reservoir diagnostic data; and
   computing the reservoir health sub-index based on the plurality of sub-category indices and a predetermined sub-category weighting factor.

\* \* \* \* \*